United States Patent [19]

Issacman et al.

[11] Patent Number: 6,127,928
[45] Date of Patent: *Oct. 3, 2000

[54] METHOD AND APPARATUS FOR LOCATING AND TRACKING DOCUMENTS AND OTHER OBJECTS

[75] Inventors: Marvin Issacman, Los Angeles; Denis McGreivy, Laguna Niguel, both of Calif.

[73] Assignee: E-Tag Systems, Inc., Laguna Niguel, Calif.

[ * ] Notice: This patent is subject to a terminal disclaimer.

[21] Appl. No.: 09/361,636

[22] Filed: Jul. 26, 1999

Related U.S. Application Data

[63] Continuation of application No. 09/021,511, Feb. 10, 1998, Pat. No. 5,936,527.

[51] Int. Cl.[7] .................................................. G08B 13/14
[52] U.S. Cl. .................................. 340/572.1; 340/568.1; 340/825.35; 340/825.49; 340/825.54
[58] Field of Search ............................. 340/572.1, 568.1, 340/825.35, 825.49, 825.54

[56] References Cited

U.S. PATENT DOCUMENTS

| | | | |
|---|---|---|---|
| 4,476,469 | 10/1984 | Lander | 340/825.49 |
| 4,703,327 | 10/1987 | Rossetti et al. | 342/44 |
| 4,725,841 | 2/1988 | Nysen et al. | 342/44 |
| 4,752,680 | 6/1988 | Larsson | 235/492 |
| 4,783,646 | 11/1988 | Matsuzaki | 340/572.5 |
| 4,799,059 | 1/1989 | Grindahl et al. | 340/870.03 |
| 4,862,160 | 8/1989 | Ekchian et al. | 340/825.54 |
| 4,884,208 | 11/1989 | Marinelli et al. | 701/300 |
| 5,057,095 | 10/1991 | Fabian | 604/362 |
| 5,063,380 | 11/1991 | Wakura | 340/825.54 |
| 5,214,410 | 5/1993 | Verster | 340/505 |
| 5,294,931 | 3/1994 | Meier | 342/44 |
| 5,340,968 | 8/1994 | Watanabe et al. | 235/380 |
| 5,424,858 | 6/1995 | Gillotte | 359/143 |
| 5,446,447 | 8/1995 | Carney et al. | 340/572.4 |
| 5,450,070 | 9/1995 | Massar et al. | 340/825.35 |
| 5,519,381 | 5/1996 | Marsh et al. | 340/572.4 |
| 5,537,105 | 7/1996 | Marsh et al. | 340/825.54 |
| 5,550,547 | 8/1996 | Chan et al. | 342/42 |
| 5,550,548 | 8/1996 | Schuermann | 342/42 |
| 5,557,280 | 9/1996 | Marsh et al. | 342/44 |
| 5,572,226 | 11/1996 | Tuttle | 343/726 |
| 5,583,819 | 12/1996 | Roesner et al. | 365/225.7 |
| 5,602,538 | 2/1997 | Orthmann et al. | 340/825.54 |
| 5,635,917 | 6/1997 | Todman | 340/825.37 |
| 5,648,765 | 7/1997 | Cresap et al. | 340/825.35 |
| 5,666,417 | 9/1997 | Liang et al. | 380/23 |
| 5,689,238 | 11/1997 | Cannon, Jr. et al. | 340/572.1 |
| 5,751,221 | 5/1998 | Stanfield et al. | 340/825.35 |
| 5,774,876 | 6/1998 | Woolley et al. | 705/28 |
| 5,779,839 | 7/1998 | Tuttle et al. | 156/213 |

*Primary Examiner*—Benjamin C. Lee
*Attorney, Agent, or Firm*—Loudermilk & Associates

[57] ABSTRACT

An apparatus and method are described for a radio frequency document control system that enables the location of documents, such as office files, to be automatically and rapidly identified. A host transceiver, controlled via a PC, transmits a coded RF signal, at a first frequency, to individually addressable, low cost, local exciters/transceivers located on shelves and/or in drawers. The local exciters, which may be sequentially addressed, retransmit the coded RF signal at a second frequency via an antenna. A passive radio frequency identification tag, containing the same code as that transmitted by the local exciter and attached to a document, such as a file folder, when in the vicinity of the antenna of the local exciter, is energized by the RF field and modulates the second frequency signal from the local exciter. The second frequency signal modulated by the energized tag is then directly received by the host transceiver. A PC, coupled to the host transceiver, enables the system to automatically and rapidly identify, down to a specific shelf or drawer, the location of tagged documents in an office environment.

62 Claims, 10 Drawing Sheets

METHOD AND APPARATUS FOR LOCATING AND TRACKING DOCUMENTS AND OTHER OBJECTS

This appln is a continuation of Ser. No. 09/021,511 filed Feb. 10, 1998 U.S. Pat. No. 5,936,527.

FIELD OF THE INVENTION

The present invention relates to devices and methods for locating and tracking objects, and more particularly to devices and methods for locating documents, particularly file folders, and other objects utilizing a computer controlled radio frequency system and radio frequency tags that are attached to such objects.

BACKGROUND OF THE INVENTION

Radio frequency identification tag ("RFID tag") arrangement systems have been used to detect and identify objects, animals, persons, etc. In the case of numerous objects, such as documents in an office or similar setting, such systems have not had much applicability. As an example, there are some 100 billion documents generated each year in the US, and many of these documents are stored in filing cabinets, drawers, shelves, etc., with no readily automated way to locate specific documents.

Existing document locating systems are generally manually operated. For example, common office document locating systems include alpha numeric labeling and computer based indexing systems. Bar code label systems, often used in conjunction with color-coded tabs and/or alpha-numeric labels, have enjoyed increased use as a document locating system over the past decade. Office files labeled with bar codes are typically located using a hand held optical scanner. Such bar code labeling systems utilize a light beam emitted from the scanner to "read" the bar code label. These systems require a direct line of sight between the scanner and the bar-code label, thus greatly limiting their utility.

File labeling based on bar codes, alpha numeric characters, or color codes require placing a file in a pre-designated location. If these files are not placed in pre-designated locations, then these filing systems do not automatically identify that a file is misplaced or lost. With bar codes, alpha numeric, and/or color coded labeling systems, the user must first search for the file in its pre-designated location before determining that the file is missing. Upon discovering that a file is missing, these systems are unable to locate the missing file.

The retrieval/replacement of misplaced or lost files and/or documents is costly and time consuming. In offices, warehouses, or other facilities having large volumes of files, significant time and energy are frequently expended searching for missing or lost files. In most instances, it is imperative that a file be quickly located. In a recent study, Gartner Group showed that (1) between 3% and 5% of files in a typical office in the US are either missing (location unknown) or lost, (2) the typical cost of locating a missing file is $100, (3) the typical cost of replacing a lost file is $500, and (4) an average US executive spends around $10,000 a year searching for missing files. The time expended to locate office documents strongly influences office productivity.

Radio frequency (RF) identification systems utilizing RFID tags are known in the art and are often used to identify the presence or location of certain objects. With such systems, either RF, light or sonic waves are illuminated onto tags attached to objects. After receiving the incident signal, the identified tag emits a response, from which the system determines the location of the responding tag. RFID systems typically consist of one or more transceivers (exciters) and one or more tags, with each tag attached to an object whose location is desired to be identified. RFID systems have been used for identifying vehicles, animals, parcels, laundry, people, railway cars, inventory in warehouses, golf balls, and the like.

An RFID tag is an electronic device that generally incorporates a specific and typically unique identification number, where the number may be "read" by an interrogating RF transceiver (transmitter/receiver) system. The tag is generally attached to an object so that the object's presence or location in a given area may be identified by an interrogating RF transceiver system which "reads" the tag's identification number. Since the communication to the tagged object is by RF energy, such systems do not require direct line-of-sight between the transceiver and the tagged object and the tagged object may be located within a closed box, cabinet, or drawer.

RF tags, sometimes described as transponders, may be active (powered by a battery) or passive (acquiring energy from the incident radio frequency field). Passive tags, such as disclosed in U.S. Pat. Nos. 4,654,658 and 4,730,188, have fewer components, are smaller in size, and generally less expensive than active tags. In order to collect sufficient energy to operate, passive tags are located typically from one centimeter up to one meter from the transceiver.

RF tags typically consist of an antenna or a coil, to collect RF energy (from which the tag derives it's operating power), and an integrated circuit (IC) which contains an identification code or other information in its on-chip memory. Attaching a tag to an object enables the object to be located with the aid of an RF interrogation system. When the transceiver transmits a coded radio frequency signal, nearby tags collect energy from the transceiver's RF field. If the tag's ID number is the same as that encoded in the incident RF field, then the tag is activated by the incident RF field and, in response, modulates the incident RF field.

Commercially available passive RF tags generally operate at low frequencies, typically below 1 MHz. Low frequency tags usually employ a multi-turn coil resulting in a tag having a thickness much greater than a standard sheet of paper or a standard file folder, thereby rendering low frequency tags unsuitable as "smart labels" on paper documents. However, high frequency passive RF tags, operating around 2.45 GHz, and typically consisting of a single turn, flat antenna, printed onto a flat single layer sheet of plastic or paper are thin and thus, their thinness renders them suitable as a smart label for tracking paper documents. These high frequency tags are being targeted for use on labels in such applications as tracking fresh food packages, clothes in laundries, garments in hospitals, baggage in airports, and the like. It is believed that these high frequency tags have not yet been used for tracking documents in office settings.

There are several possible reasons why high frequency RF tags have not been targeted for tracking office documents. One possible reason why high frequency tags have not enjoyed much success in this field may be because high frequency RF fields are readily absorbed by moisture typically found in office documents. Also, office files are commonly stored in metal cabinets and, since RF fields do not readily transmit through metal, achieving transmission of RF fields into and out of a metal cabinet is perceived to be a difficult task. Further, a large, multi-office organization may have hundreds, thousands, or even millions of files stored in numerous, distant locations, which may be located throughout many different sites. The magnitude of the transmitted RF field decreases rapidly as the distance increases from the scanner. Since the tag needs a finite amount of RF energy to become activated, there is a maximum distance, typically one or two meters, beyond which a passive tag collects insufficient RF energy to activate its on chip circuitry. To have practical value in a commercial setting, it is believed that the user should be able to locate a tagged document from a distance of at least five meters between the users' PC and the tagged document.

Several conventional RFD tag systems will now be described. PFID tag systems generally consist of a personal computer (PC) or other computing device, a radio frequency transmitter which sends an RF signal to the tag and which "excites" the tag into generating an RF response, and a receiver which receives the excited response from the tag. Such combined transmitter/receiver units are described, for example, in U.S. Pat. Nos. 5,537,105 and 5,550,547.

Figure 1:
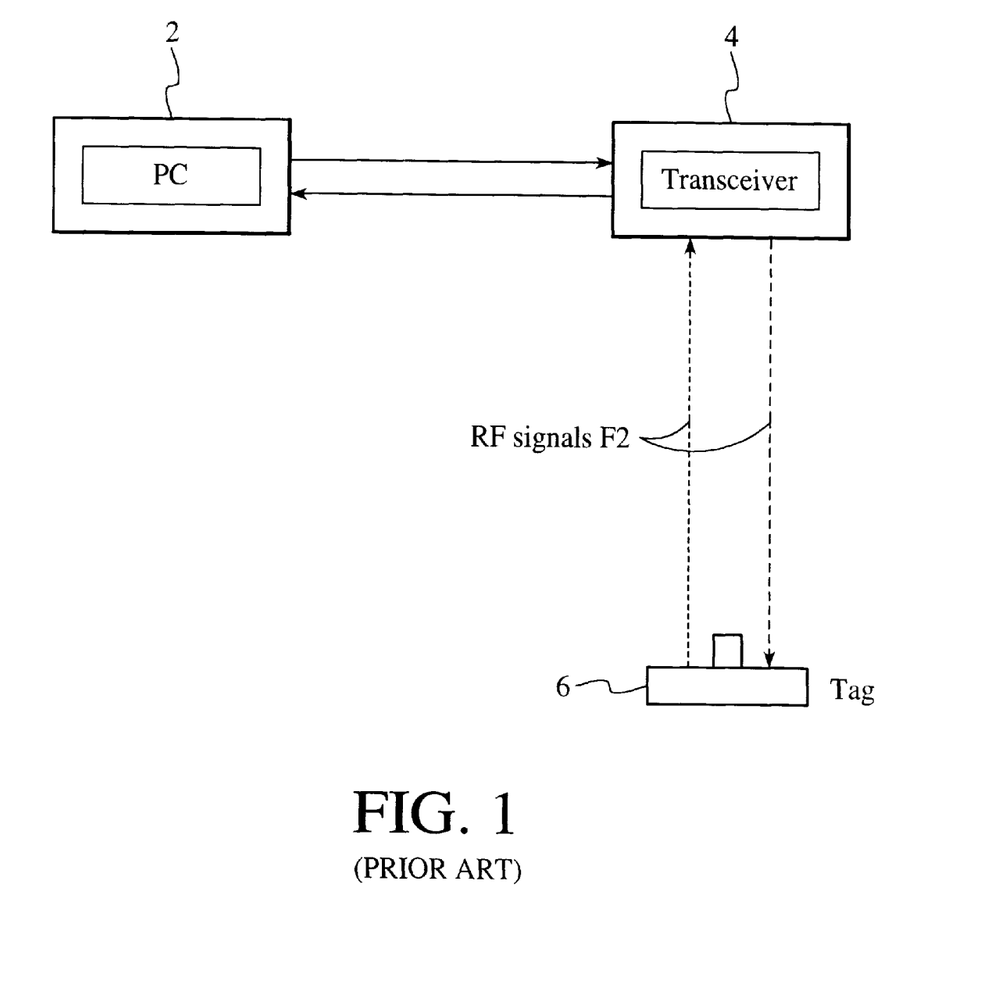
FIG. 1 is a block diagram of a conventional RFID system.

A conventional RFID tag system architecture is illustrated in FIG. 1 and includes PC 2, transceiver (transmitter/receiver unit) 4, and passive tag 6. The communication link between PC 2 and transceiver 4 may be via hard wiring, RF, or optical link. Transceiver 4 transmits an RF signal to tag 6, which excites tag 6. Transceiver 4 then receives a response from tag 6, which is transmitted to PC 2 for identifying the characteristics of tag 6. Examples of prior art RFD systems employing this direct communication between the transceiver and the tag are disclosed in U.S. Pat. Nos. 5,537,105 and 5,550,547.

In other conventional RFD systems, it is necessary to provide a separate transceiver unit at each location from which the tags are to be monitored. As described in U.S. Pat. No. 4,703,327, a passive interrogator label system is frequently configured such that a plurality of tags are interrogated from a number of different locations. For example, if persons with RFID tags are authorized to enter a building, several transmitting and receiving antennas are normally placed near different doors to the building to identify the RFID tags. Another example is where the RFID tags are placed on cattle which are monitored at different locations, such as a holding area, a feeding area, etc. Further, the RFID tags may be placed on railroad cars to permit car identification at different locations. As the number of locations increases, the equipment requirements and costs also increase significantly.

Figure 2:
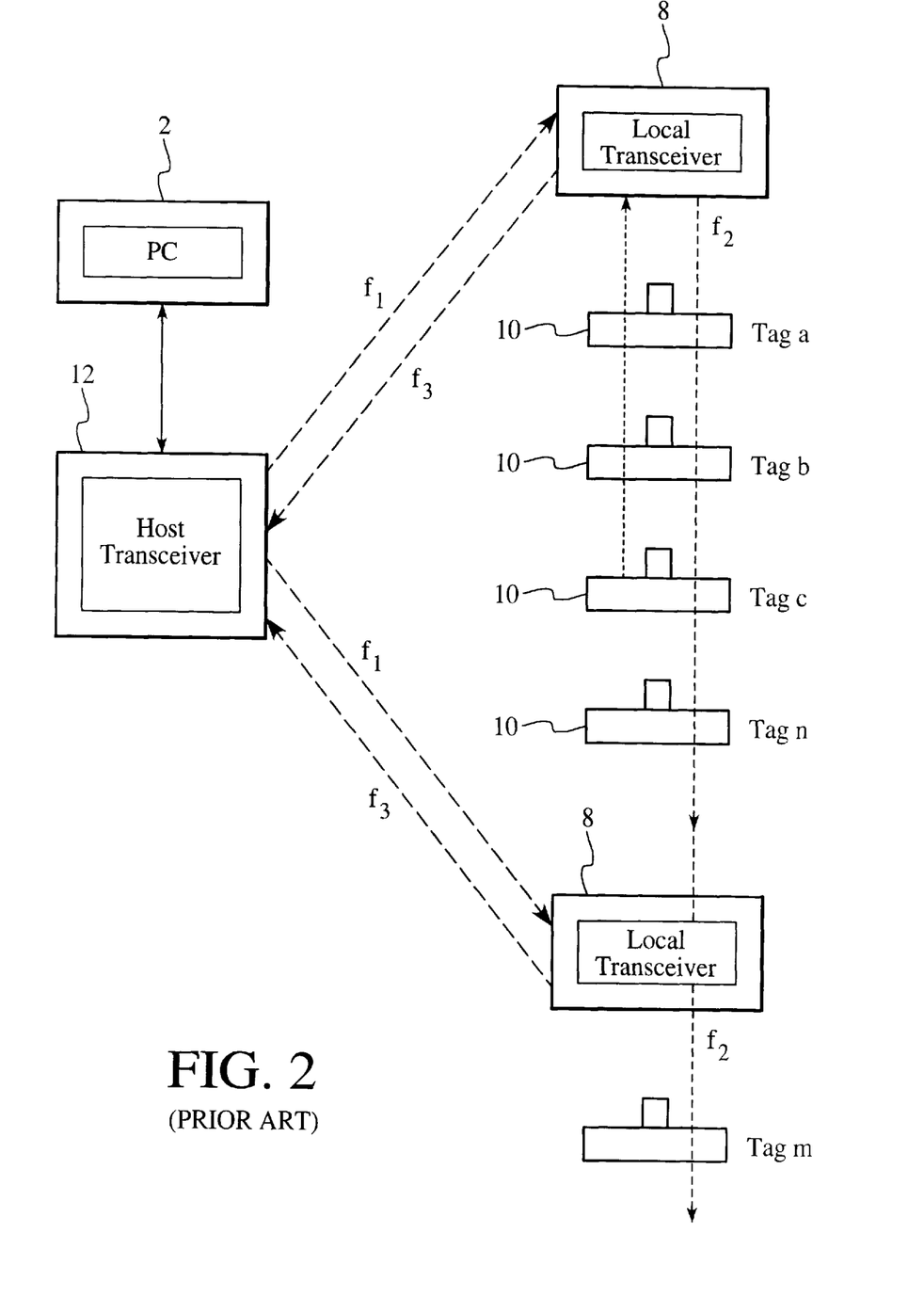
FIG. 2 is a block diagram of another conventional RFID system.

FIG. 2 is an illustration of another conventional RFID system. As illustrated in FIG. 2, such a conventional RFID system consists of host transceiver 12, a plurality of local transceivers 8, and a plurality of tags 10 $a, b, c \ldots n$. In some instances, PC 2 controls or exchanges data with host transceiver 12. Again, the communication link between PC 2 and host transceiver 12 may be via hard-wiring, via RF, or via an optical link. The plurality of local transceivers 8 and the host transceiver 12 generally each include a transmitter and a receiver, such as are known in the art. Each tag 10 $a, b, c, \ldots n$, which is attached to the object to be located, such as an animal, person, box, etc., contains a unique, preprogrammed identification number. A digitized RF signal in which the unique ID number is encoded is transmitted, at a first frequency $f_1$, from the host transceiver 12 to the plurality of local transceivers 8. Local transceivers 8 in turn transmit, at a second frequency $f_2$, the received RF signal to the plurality of tags 10 $a, b, c, \ldots n$. A particular tag 10 (e.g., 10c) that is within the transmitted range and having the associated identification number will respond by modulating the second frequency $f_2$. The modulated RF field $f_2$ is detected by the receiver portion of local transceiver 8, thereby identifying the excited tag. The local transceiver then transmits, at a third frequency $f_3$, to host transceiver 12, which in turn identifies the tag data with the aid of PC 2. The identification and location of the excited tag can be determined because each local transceiver 8 has a unique identification number, and PC 2 and host transceiver 12 can address each local transceiver 8 uniquely and sequentially.

The system described above herein is termed "two way" because the communication path is bi-directional, or two way, from host transceiver 12 to local transceiver 8, from local transceiver 8 to tags 10, then back from tags 10 to local transceiver 8, then from local transceiver 8 to host transceiver 12. Local transceivers 8 in the "two way" RF system incorporate one receiver which receives a signal of the first frequency $f_1$ from host 12, one transmitter which transmits a signal of the second frequency $f_2$ exciting tags 10, one receiver which receives the modulated response signal of the second frequency $f_2$ from an excited tag 10, and one transmitter which transmits a signal at the third frequency $f_3$ back to host 12. Similarly, host 12 has one transmitter which transmits a signal at the first frequency $f_1$ to the local and one receiver which receives a signal of the third frequency $f_3$ from local transceiver 8. In the most general case first frequency $f_1$, second frequency $f_2$, and third frequency $f_3$ are different frequencies. In a simpler, more practical case, first frequency $f_1$ and third frequency $f_3$ are the same, while second frequency $f_2$ is different.

The performance, complexity, and cost of such two-way systems, however, have limited utility and applicability in an office environment. The architectures of existing two-way RFID systems, described in FIGS. 1 and 2 above, for example, would require a very large number of transmitters and receivers to implement an automatic document tracking system in a commercial office. Specifically, the architecture of an RFID system shown in FIG. 2 and described above would require three transmitters and three receivers. The large number of transmitters and receivers employed in such an architecture would render the cost of an automatic document locating system impractical and prohibitive in essentially all applications. There is a widespread demand for a cost effective, automatic document location system for commercial offices and, at present, it is believed that no such system exists.

SUMMARY OF THE INVENTION

The present invention relates generally to using RFID tags to automatically locate and/or to track objects, particularly objects that are movable, and which may be located at any time in a variety of locations. Although the present invention can be used to automatically locate and track any movable object, it is particularly directed for automatically locating and tracking files, documents or similar objects on shelves, in drawers or in metal filing cabinets in offices, warehouses or other commercial settings.

Further, the present invention provides an RF system architecture in which the tag's modulated signal, which results from the RF signal that excites the tag, is communicated directly from the tag to a host transceiver. The RF system architecture of the present invention eliminates in the local transceiver a second frequency $f_2$ receiver and a third frequency $f_3$ transmitter. The local transceiver of the present invention can be referred to as a "local exciter." Such an architecture may significantly reduce the number of receivers in the total RF system and dramatically reduce the system cost and complexity.

The present invention provides a system and method for utilizing high frequency tags for locating and tracking documents, files, and other objects. Preferably, the present invention utilizes high frequency tags placed on an outer edge or peripheral portion of the objects. Furthermore, the physical distance, or range, along a shelf or drawer over which local exciters can communicate to tags can be substantially and cost-effectively increased through the use of simple antennas, preferably placing them along the edges of the shelves/drawers on which the objects or documents are to be located.

In accordance with the present invention, devices and methods are provided for locating and tracking files, including misplaced files, as well as identifying which files, documents or similar objects are missing or lost. In preferred embodiments, the present invention includes a PC, a host transceiver, a plurality of local exciters, and a plurality of high frequency passive tags. Preferably, the host transceiver transmits a first RF signal, at a first frequency $f_1$, to the plurality of local exciters. The local exciters in turn receive the first RF signal and selectively transmit a second RF signal, at a second frequency $f_2$, to the plurality of tags, thereby exciting the tags. An identified tag from the plurality of tags, selectively responds by modulating the second frequency $f_2$ and such modulation is received directly by the host transceiver.

One object of the present invention is to provide a computer based system which automatically and/or manually locates and tracks objects such as documents, particularly files, in commercial and/or residential offices.

Another object of the present invention is to provide an automatic and/or manual tracking system that locates objects, such as documents, including files, that are placed or stored, individually or collectively, in cabinets, on shelves and on desks, including containers placed or stored in fabricated from metal, in commercial, residential, or other offices and locations.

Another object of the present invention is to provide an RFID system which is substantially simpler and less complex than present RFID tracking systems.

Another object of the present invention is to provide an RFID system which is substantially lower in cost than present RFID tracking systems.

Another object of the present invention is to provide an automatic document locating system that enables users to rapidly identify which files are missing from the system.

Yet another object of the present invention is to provide a system and method to locate and track documents, and similar objects from a distance of over three meters from the passively tagged object to the user's PC.

A still further object of the present invention is to locate a single tagged document among a plurality of documents, while utilizing low cost high frequency tags.

A still further object of the present invention is to attach the tag near the outer perimeter edge of the document to minimize the absorption of the RF field by the moisture typically contained in paper, thereby increasing the distance over which a lower cost high frequency tag on a document may be detected and located.

It is yet another object of the present invention to provide an antenna on or near the storage area shelves holding a collection of the objects to increase the transmission distance from the local transmitter to the responding tags.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

The present invention may be more fully understood and appreciated by a description of conventional and certain preferred embodiments in conjunction with the attached drawings in which.

DETAILED DESCRIPTION OF THE PREFERRED EMBODIMENTS

The present invention will be described in greater detail, which may serve to further the understanding of the preferred embodiments of the present invention. As described elsewhere herein, various refinements and substitutions of the various embodiments are possible based on the principles and teachings herein.

In accordance with the present invention, an automatic tag system architecture is provided that distributes the required functions in the system so that the total system cost is minimized, while providing the capability to automatically identify the location of any tagged document in an office. In general, the function of the automatic tag document control system is to rapidly identify the location of office documents, such as file folders, down to the individual shelf or drawer, even when the file is in an enclosed environment such as a metal cabinet, cardboard box, envelope, or other metal, wood, paper, plastic or other container environments in which the document or other tagged object may not be visible to the human eye.

In one embodiment, the automatic tag system includes RFID tags attached to documents, a host RF transceiver system, a plurality of local (exciter) transmitter-receiver units, and a PC.

Figure 3:
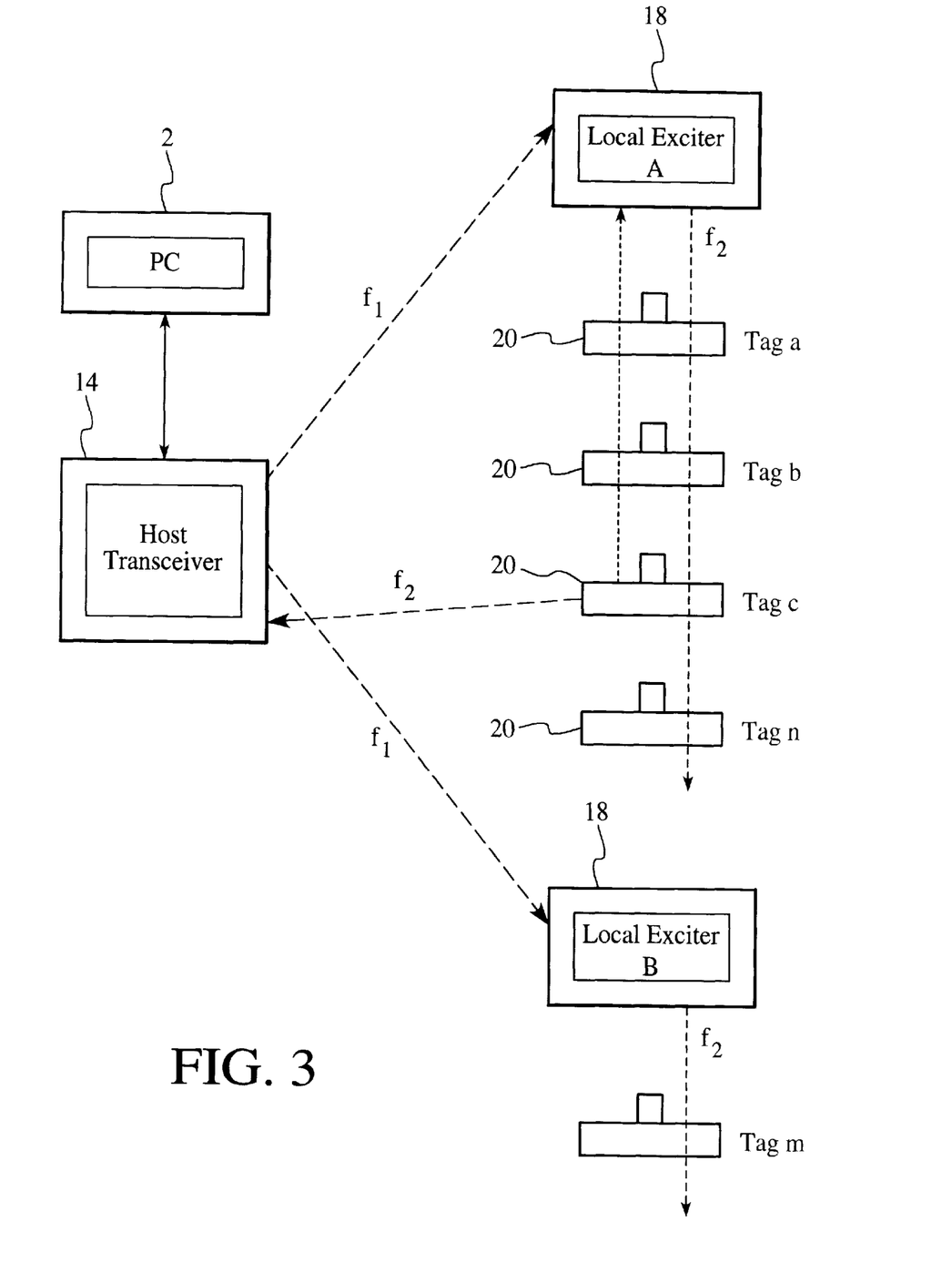
FIG. 3 is a simplified block diagram of an RFID system according to the present invention.

With reference to FIG. 3, a preferred embodiment of the present invention will now be described. In FIG. 3, an automatic tag system includes a plurality of RFID tags 20 a, b, c, . . . n, wherein each tag 20 a, b, c, . . . n has a unique identification code, and wherein each tag 20 is attached to the document (not shown) whose location is desired to be located/identified at some point in time. A plurality of low cost local exciters 18 (including a receiver of a first frequency $f_1$ and a transmitter of a second frequency $f_2$, which are hereafter described as "local" exciters) are placed on the shelves and drawers in an office, typically one per shelf or drawer. High performance host transceiver 14 (including a transmitter of a first frequency $f_1$ and a receiver of a second frequency $f_2$, which is termed the "host" unit) is placed in a central location in the office, typically near PC 2, or in a central location such as in the ceiling of the office. The communication link between PC 2 and host 14 may be hardwired, e.g., via a RS232 serial port, or via an RF link, or via an optical link. Host 14 transmits a radio frequency signal at the first frequency $f_1$ to the receiver of local exciter(s) 18. Then, local exciter 18 transmits a signal at the second radio frequency $f_2$, which is typically higher than the first frequency $f_1$, to a plurality of tags 20. Thereafter, if one of the plurality of tags 20 is selected by the second frequency $f_2$ signal, then that tag's response modulates the incident second frequency $f_2$ and that modulation is detected by the host 14 at the second frequency $f_2$. In preferred embodiments, host 14 is able to detect the response from the selected tag at tag-to-host distances from typically 5 cms to over 15 meters. In a typical office, host 14 may address hundreds, possibly thousands, of shelves/drawers, identifying the specific shelf or drawer of an individually tagged document.

PC 2 is interfaced to host transceiver 14 in a conventional manner. The two main functional blocks of host 14 are a first frequency $f_1$ low data rate transmitter and a second frequency $f_2$ high data rate receiver. The host transmitter addresses a selected local exciter 18, whose two main functional blocks are a first frequency $f_1$ low data rate receiver and a second frequency $f_2$ high data rate transmitter, and the host transmitter transmits the requested tag address to the local receiver through the first frequency $f_1$. Local exciter 18, via its second frequency $f_2$ high data rate transmitter, then illuminates, powers and addresses, all of tags 20 in its range. In such preferred embodiments, host 14 then directly receives any response from a correctly addressed tag 20 at the second frequency $f_2$, preprocesses and digitizes that signal, and downloads it to PC 2 for detection. After processing the received data, PC 2 can then determine whether tag 20 has been located.

A network of automatic tag systems, i.e., a multiplicity of host transceivers, each connected to an office PC network, allows the location of any tagged document in large, multi-office environments to be identified, provided that there is a local unit on the shelf/drawer containing the tagged document and provided that the shelf/drawer is within a distance of typically up to 50 feet, for example, of the host. The host, implemented in conjunction with PC software, tracks the location of all the tags within the area of the host's range, hereinafter defined as the host's "cell", which may overlap with the cells of adjacent hosts. A typical search for a specific tag involves confirming only that a specific tag is within range of the specified local exciter. In this preferred embodiment, local exciters 18 are sequentially addressed by the host 14 and only one local exciter is activated at any given time. If a tagged document is misplaced, the system may sequentially activate all local exciters until the location of the missing tagged document is identified, or until all local exciters have been activated without locating the specific tag (e.g., a lost file situation).

The system may be programmed to perform a periodic search and confirm cycle, namely an inventory check of all tags in the system. At any time of the day or night, the automatic tag system can identify all files not placed on a shelf or drawer. In embodiments where users employ access codes, the automatic tag system can indicate to the user all persons who have identified the location of any file and, more importantly, the name of the last person to identify the location of the now-missing file. Identifying who was the last person to know the location of a file is extremely valuable information to system users searching for missing files. In certain embodiments, the documents may be contained in an area having an entry through which users must pass to enter into or exit from the area. In such embodiments, one or more tag readers of design similar to those in the existing art and operated in conjunction with the describe invention may be positioned in proximity to the entry in such a manner that the identification codes from tagged documents may be read as they pass through the entry. A user access code may be employed to control entry into and/or exit from the area, and in certain embodiments the user access code is provided in a tag on the user, so that the user access code and the identification codes from tagged documents may be simultaneously read as the user passes the entry with the tagged documents (user presence at the entry may be sensed, for example, to activate the reading function, etc.).

In other such embodiments, a database is maintained containing identification codes and other data characteristic of the particular documents or files. Access to the database may be controlled by user access code so that only authorized users (those with a "need-to-know," etc.) may retrieve information from the database, implementing a hierarchical or other type security system (e.g., the system will not enable a user to locate or obtain information regarding a document that is not permitted by that user's access code, etc.). The computer controlling the database also may store data indicating which user queried for particular objects, which again may facilitate the recovery of a lost document or file by identifying users who recently looked for or had an interest in, and perhaps located and possessed, the now-missing document or file. Such database and usage and user access control and the like (and other features described herein) may be combined for various advantageous applications in accordance with the present invention.

Unlike conventional document filing systems, the automatic tag system does not require that a file be placed in any pre-designated location. As long as the tagged file is placed on any shelf or in any drawer containing a local exciter unit the system will either identify the location of the file and/or the name of the last person to know of its location.

Figure 4:
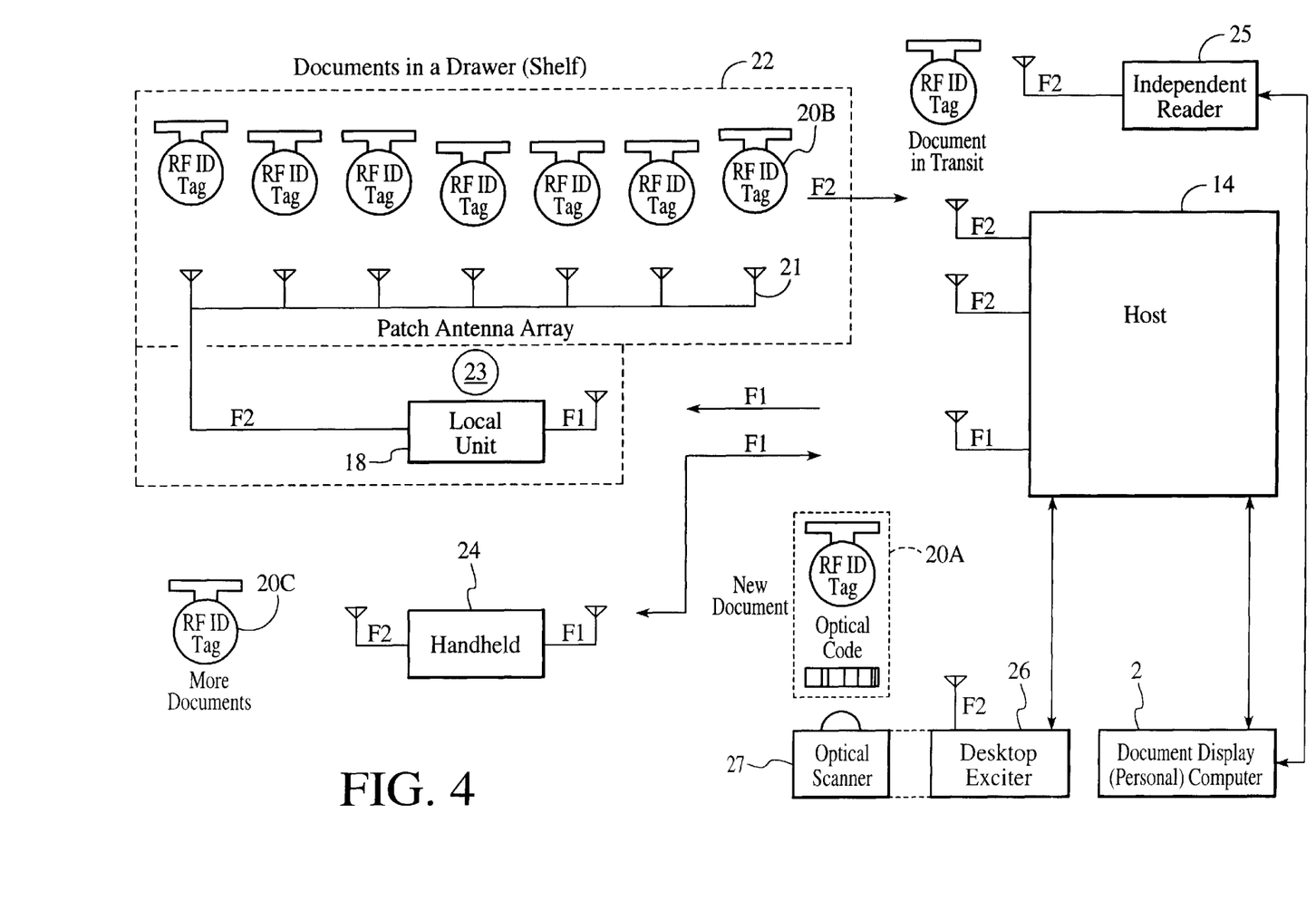
FIG. 4 is a more detailed block diagram of an RFID system according to the present invention.

With reference to FIG. 4, a more detailed block diagram of one embodiment of an RFID system according to the present invention will now be discussed. PC 2 transmits commands to host transceiver 14, which then selectively and sequentially transmits commands to either a plurality of local exciters 18, to one or more desktop exciter (or exciters) 26 (which may be used to read and/or program tags such as illustrated tag 20A) and/or to one or more hand held exciters 24. Desktop exciter 26 (or alternatively PC 2) may be coupled to optical scanner 27, which reads/captures alpha numerical/bar code and/or RFID information, which may be, for example, associatively stored in a database accessed or managed by PC 2. Host transceiver 14 then receives a return signal from excited tags 20A, 20B, or 20C, and this signal is downloaded to PC 2 for processing and detection.

In the illustrated preferred embodiment, a plurality of tags 20B may be located on a plurality of documents or file folders, etc., which are located in, for example, file drawer 22 (file drawer 22 may be a typical drawer, shelf or other container or space in a filing cabinet or other suitable retainer of documents, file folders, etc.). Also, in the preferred embodiment, file drawer 22 includes aperture 23 as a suitable opening for enabling RF signal to enter/exit the cabinet. In preferred embodiments, a particular file drawer 22 has associated therewith a corresponding local exciter 18, which may be coupled to antenna 21 (which may be a loop antenna, antenna array or other antenna) for more optimally transmitting an RF signal to tags 20B. It should be understood that, in other embodiments, more than one local exciter 18 may be provided in a file drawer, shelf, space, volume, etc., and alternatively a single exciter 18 could provide RF signals to more than one file drawer, shelf, space, volume, etc. What is important is that local exciter 18, which may include antenna 21, be arranged so as to provide sufficient RF energy to tags 20B within the desired target range.

Figure 5:
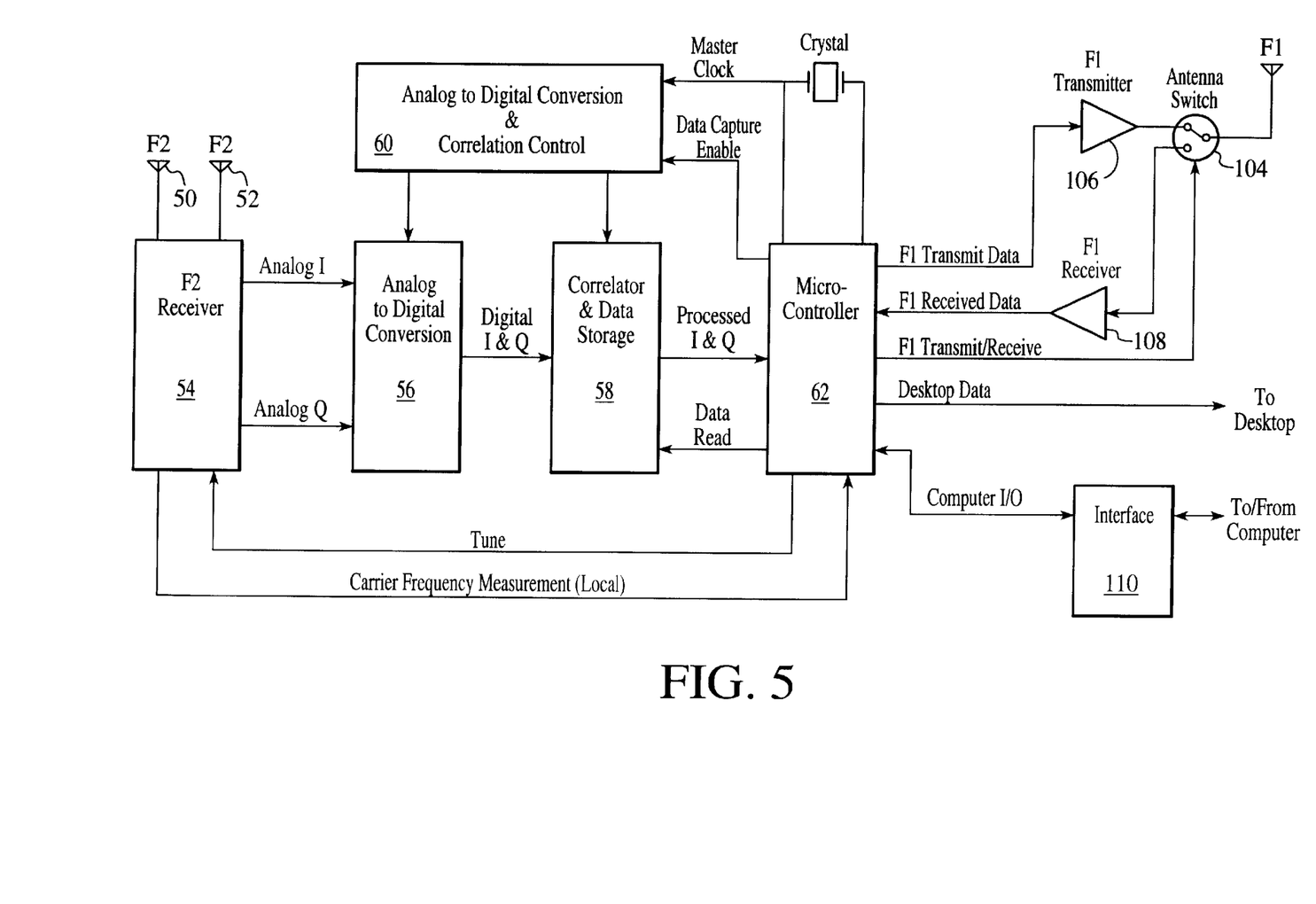
FIG. 5 is a diagram illustrating an embodiment of a host transceiver that may be utilized in accordance with preferred embodiments of the present invention.

With reference to FIG. 5, an embodiment of host transceiver 14 according to preferred embodiments of the present invention will now be described. Host transceiver 14 receives, as an RF signal input, a response from an excited tag, at second frequency $f_2$, from either diversity antenna 50 or 52 into receiver 54. As is well known in the radio frequency communication art, the diversity antennas are located a sufficient distance apart to achieve spatial diversity, circumventing signal nulls due to multipath propogation.

The modulated signal created by the tag at the preferred frequency of operation may be generated with any phase relative to the second frequency $f_2$ emitted by the local exciter. The output of receiver 54, which is preferably in in-phase and quadrature format (I & Q), to detect the tag's randomly phased signal, is coupled to analog-to-digital converter (ADC) 56. Preferably, ADC 56 is a dual channel analog-to-digital converter that performs simultaneous conversions on the I and Q signals. The digital representation of the tag's signal is output from ADC 56 to correlator 58, which autocorrelates the modulated signal from the excited tag, whereby the signal to noise ratio of the modulated signal from the tag is improved. Correlator 58 outputs the correlated digital data to CPU 62. Control logic 60 provides necessary timing for ADC 56 and correlator 58. Although not expressly shown, CPU 62 also provides various control and related functions to the elements of host transceiver 14 illustrated in FIG. 4. As is well known in the signal processing art, host transceiver autocorrelates the modulated signal from the excited tag, where the signal to noise ratio of the modulated signal from the tag is improved.

CPU 62 may be a suitable high speed RISC CPU, which controls most functions of the second frequency receiver, and may be controlled from computer PC 2 via host interface 110, which, in the preferred embodiment, is an RS 232 serial interface. CPU 62 also sends data to computer PC2 via interface 110, and also sends data to first frequency (i.e., low frequency) transmitter 106, and receives data from first frequency receiver 108. An antenna is selectively coupled to transmitter 106 and receiver 108 by switch 104 under control of CPU 62. Transmitter 106 preferably is a single chip crystal controlled FM transmitter operating at the first frequency and transmitting data to local exciters and hand held exciters under control of CPU 62. Receiver 108 preferably is a single chip crystal controlled single conversion FM receiver operating at the first frequency and receiving data from hand held exciters.

As will be appreciated by those in the art, CPU 62 provides various other control functions. For example, in response to specific commands, CPU 62 may initiate the calibration of a local, desktop, or hand held exciter, the interrogation of tag label via a specific exciter and download the resulting correlated I and Q data from correlator 58 to computer 2, interrogate or program a label via a desktop exciter or relay commands to/from a hand held exciter. CPU 62 also may measure the local exciter frequency, for example, by frequency counting. CPU 62 may set the tuning frequency of the second frequency receiver 54 directly. Receiver 54 also provides a reference sample of the local exciter's frequency, which may be directly measured by CPU's 62 integral counter circuitry. After measuring the local exciter frequency, setting the second frequency as necessary, CPU 62 may retune receiver 54 to track the precise frequency of the local exciter. CPU 62 may receive a variety of commands from PC 2 in order to provide various system control and functionality.

Figure 6:
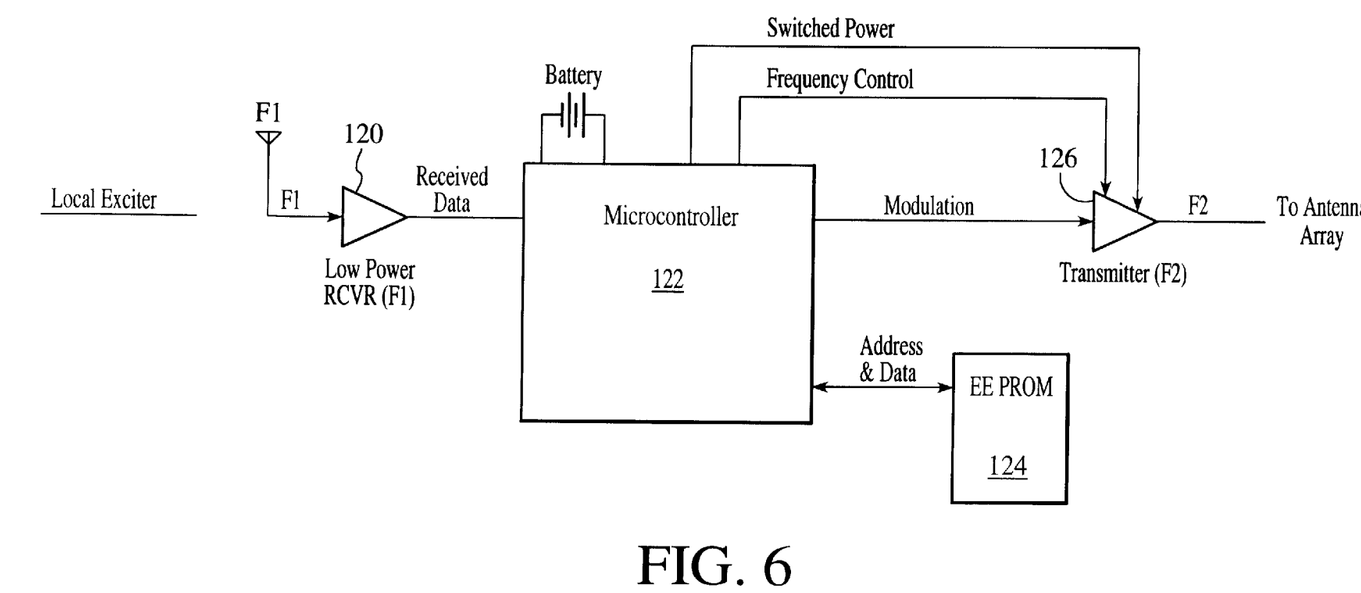
FIG. 6 is a diagram illustrating an embodiment of a local exciter that may be utilized in accordance with preferred embodiments of the present invention.

With reference to FIG. 6, a local exciter according to preferred embodiments of the present invention will now be described. Such a local exciter consists of a low power RF receiver 120, which may be periodically enabled, and which receives the local address of the exciter at a first frequency from a host transceiver (such as host transmitter 14). If the local exciter is selected by the host transceiver, then RF receiver 120 also receives a tag address.

In a preferred embodiment, RF receiver 120 is continuously powered by batteries, with the power switched in and out of standby mode by microcontroller 122. A memory device, such an EEPROM 124, is associated with microcontroller 122 (which may alternatively be integrated with microcontroller 122) and preferably provides non-volatile storage of the local exciter's unique address, the tag interrogation sequence, and the tag timing parameters. Microcontroller 122 is programmed and operates such that a periodic wake up occurs typically every 0.5 seconds (or some other predetermined time interval) through an intelligent wake-up algorithm. Such a wake-up algorithm, for example, could provide programmable wake-up periods, depending on system demand, which could be implemented to conserve battery power in a manner suitable for the particular application.

Again, with reference to FIG. 6, transmitter 126, which is selectively powered, modulated, and has its frequency set by microcontroller 122, operates directly at a second frequency. As is well known in the radio frequency communication art, the second frequency may be adjusted over sufficient range to achieve frequency diversity, circumventing signal nulls due to multipath propagation. In preferred embodiments, long term frequency control is implemented by measuring the operating second frequency at the host transceiver and correcting the frequency of transmitter 126 as needed during subsequent read cycles through commands provided to microcontroller 122. In one embodiment, a linear monotonic voltage/frequency coefficient is employed to enable monitoring of the condition of the battery supplying power to the local exciter. Transmitter 126 has sufficient RF output, modulation bandwidth, and modulation depth to energize and address one or more tags.

Upon receipt of the selected local exciter's address, local exciters translates the accompanying tag label address into an RFID tag code format and illuminates the tag labels at a second frequency. An RF antenna (see, e.g., antenna 21 of FIG. 4) enables the local unit's RF output to be broadcast to one or more tags on the shelf/drawer or other volume.

Figure 7:
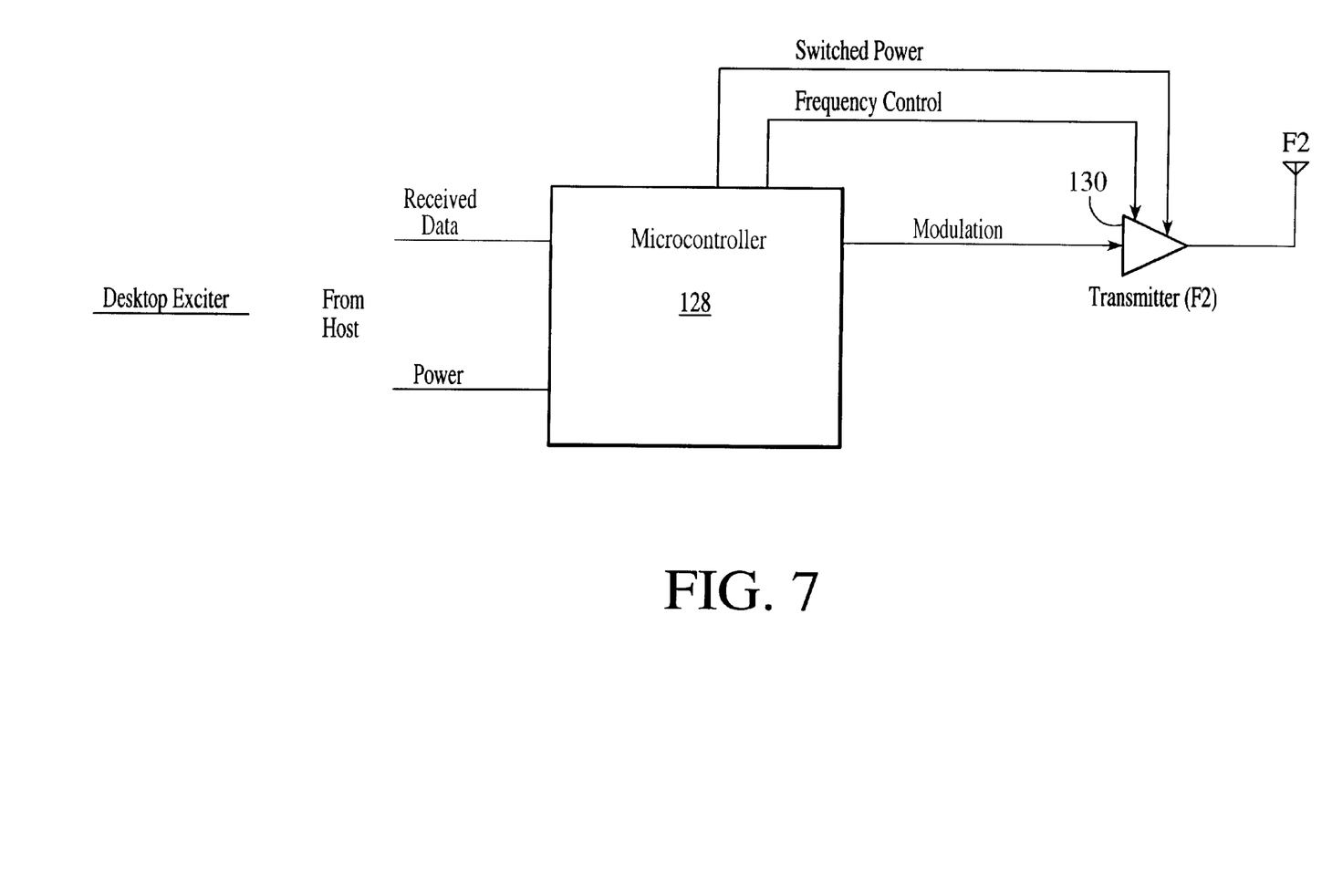
FIG. 7 is a diagram illustrating an embodiment of a desktop exciter that may be utilized in accordance with preferred embodiments of the present invention.

With reference to FIG. 7, a desktop exciter (such as desktop exciter 26 of FIG. 4) according to preferred embodiments of the present invention will now be described. The desktop exciter, in general, functions identically to the local exciter, except that, in certain embodiments, the desktop exciter receives control signals via a hardwire serial link from the host transceiver rather than via a radio link from the host transceiver. The desktop exciter is additionally able, in conjunction with the host transceiver and the PC, to interrogate a tag for its specific code (i.e., read the identification code of one or more tags), and, in conjunction with writeable tags (certain tags useable with embodiments are pre-written or "read only"), also program tag serial numbers or additional data to be written in the tag. The desktop exciter provides RF illumination at a second frequency to a tag with an address sequence set by commands from the PC relayed via the host transceiver. In preferred embodiments, the desktop exciter is able to read individual tag codes and program individual tag codes on field programmable tags. The ability to read identification tags from codes may be utilized to track documents, for example, as they leave a predetermined area (by passing through an entry, etc.) as previously described.

In preferred embodiments, desktop exciter, which includes transmitter 130, operates directly at the output frequency (the second frequency, discussed above). Long term frequency control is accomplished by measuring the operating frequency at the host transceiver and correcting the transmitter frequency as necessary during subsequent cycles through commands provided to microcontroller 128 from the host transceiver.

Transmitter 130 has sufficient RF output, modulation bandwidth and modulation depth to energize and address one or more tags. RF transmitter 130 is selectively powered and controlled by microcontroller 128. A suitable antenna structure (not shown) may be integrated onto the desktop circuit board.

Figure 8:
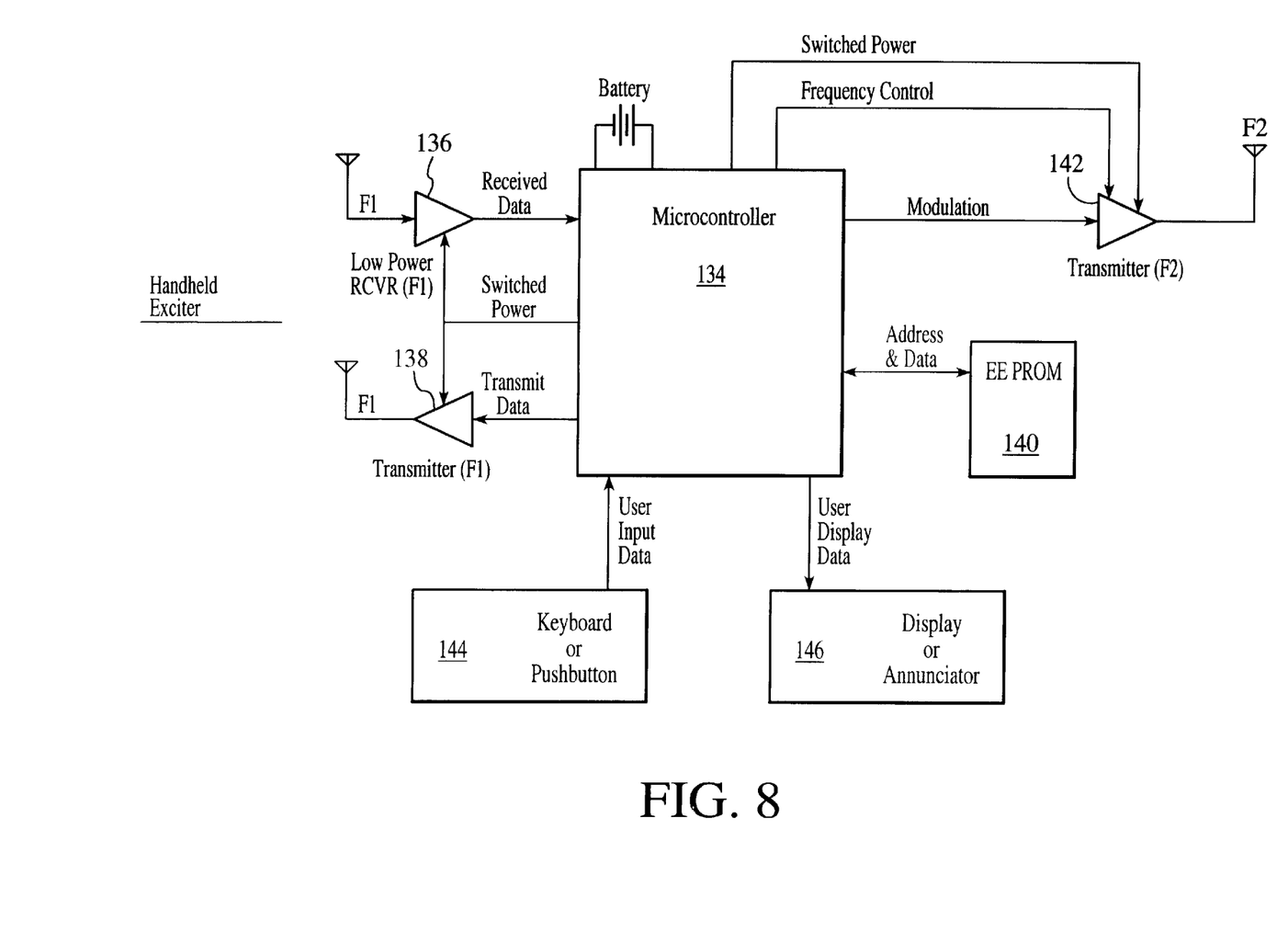
FIG. 8 is a diagram illustrating an embodiment of a hand held exciter that may be utilized in accordance with preferred embodiments of the present invention.

With reference to FIG. 8, a hand held exciter (such as hand held exciter 24 of FIG. 4) according to preferred embodiments of the present invention will now be described. Preferably, hand held exciters of the present invention include functionality similar to a local exciter. Such a hand held exciter may provide high power illumination to a group of tags at one time at the second frequency $f_2$, with an address sequence set by commands from the PC that is relayed via the host transceiver. Also, preferably, the hand held exciter may provide local indication of addressed tag detection. The hand held exciter allows a user to manually scan a plurality of tagged documents that may reside, for example, on a top surface of a desk, or in a pile of documents on the floor. The hand held exciter may, for example, in a small office replace the need for local exciters on each shelf or in each drawer. The hand held exciter may thus provide a low cost alternative to the fully automatic host-local tag system. The hand held exciter may include a mechanism that alerts the user of the location of the desired tagged document.

As illustrated in FIG. 8, such a hand held exciter includes microcontroller 134, which preferably includes a memory device such as a serial EEPROM 140, which may be alternatively be integrated with microcontroller 134, which provides non-volatile storage of the hand held exciter's unique address, tag interrogation sequence and tag timing parameters. Microcontroller 134 also may be programmed to "wake up" periodically, typically every 0.5 seconds, for example (or some other predetermined time interval), in a manner analogous to the local exciter discussed in connection with FIG. 6, or in some other manner suitable for the specific application. Microcontroller 134 powers and controls receiver 136, and, in operation, searches for a predetermined preamble plus the hand held exciter's address. If a detected address does not match the address of the hand-held exciter, then microcontroller 134 may go into a sleep mode. If, on the other hand, an address match is detected, then microcontroller 134 waits for the balance of the code.

In a preferred embodiment, receiver 136 may be a single chip, crystal controlled, single conversion FM receiver operating at a first frequency $f_1$ which receives data from the host transceiver. Receiver 136 preferably is continuously powered and switched in and out of standby mode under the control of microcontroller 134. Transmitter 138 (generally provided to enable two-way communications with the host transceiver if desired, for example, to enable the hand held exciter to query the host for status, search or other information or the like) preferably is a single chip crystal controlled FM transmitter operating at the first frequency which transmits return data to the host transceiver. The modulating data comes directly from microcontroller 134, and transmitter 138 is selectively powered and controlled by microcontroller 134. Transmitter 142 operates directly at the output frequency (the "second" frequency, discussed above). Frequency control is accomplished by measuring the operating frequency at the host transceiver and correcting transmitter frequency as necessary during subsequent accesses through commands provided to microcontroller 134 from the host transceiver. Transmitter 142 also is powered and controlled by microcontroller 134.

Transmitter 142 has sufficient output energy and modulation bandwidth as required for compatibility with the system tags. A directional antenna array (not shown) may be mounted integral to and on, for example, the front of the hand held exciter. Display monitor 146 is coupled to microcontroller 134 and displays, for example, the selected document name(s) or file number(s) or other control or status information. Display monitor also may alert the user using audio tones using a speaker or other similar device (not shown). Keyboard 144 may be coupled to microcontroller 134 for user input, which optionally may be relayed back to the host transceiver via first frequency under control of microcontroller 134.

In one embodiment of the hand held exciter, keyboard 144 may consist of a single button which initiates a search cycle by sending a request to host 14, by means of RF transmitter 138, to search for documents previously selected by means of PC 2. In this configuration, display 146 may consist of a single LED or the like. An alternative embodiment allows the user to enter the location at which the requested document is found. A minimal configuration of the hand-held exciter would include receiver 136, microcontroller 134, memory 140, transmitter 142, and LED display 146 and functions in a manner similar to a local exciter.

In offices, warehouses, factories, and the like, a wide variety of objects are presently tracked using optical bar codes and hand held scanners. The utility of a hand held scanner may be expanded if the functions of scanning optical bar code labels and RF tags are both integrated into a single hand held unit, forming a single combination optical bar code-RF tag scanner.

Figure 9:
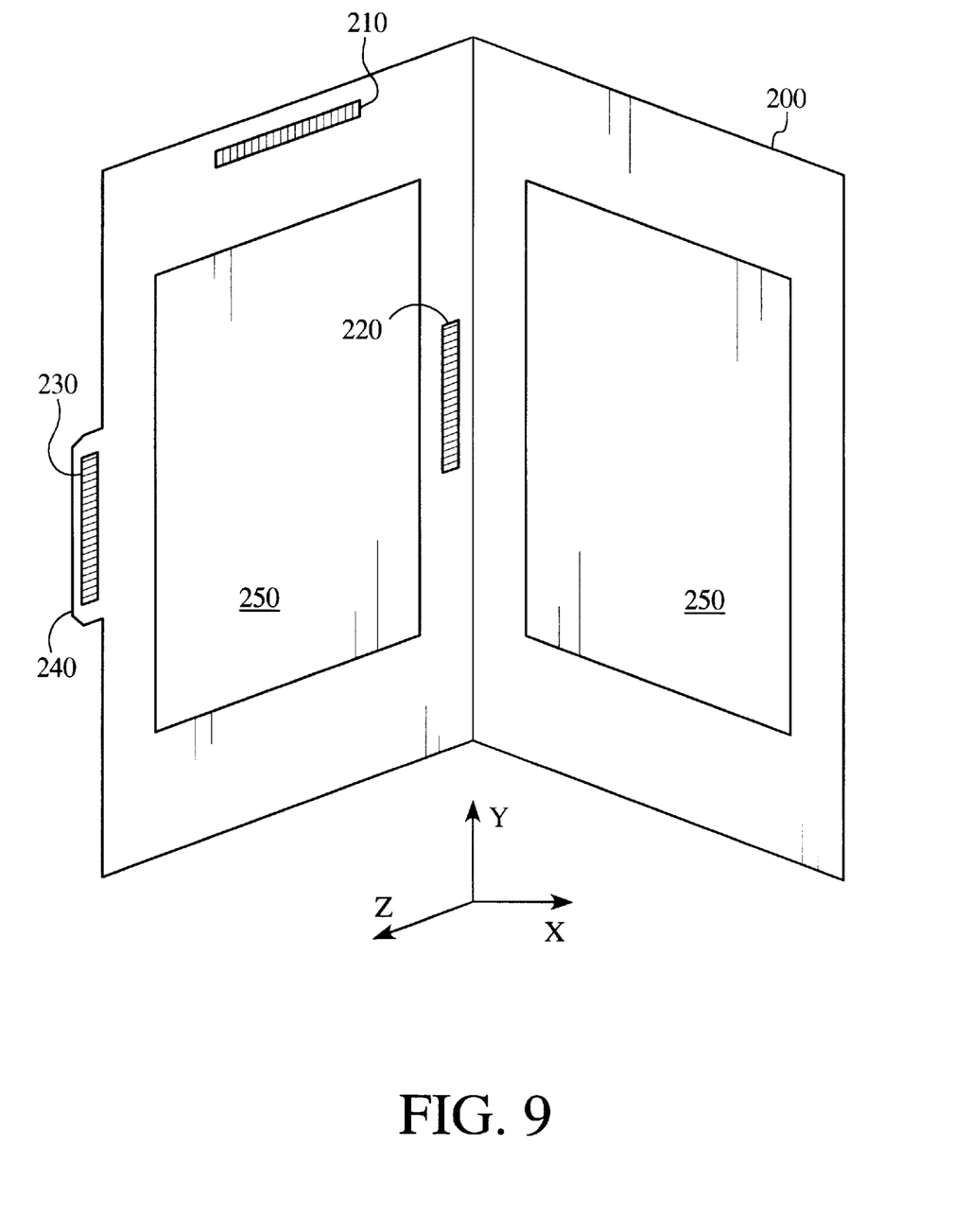
FIG. 9 illustrates the preferred placement of a tag on a document, file, or other similar object.

FIG. 9 illustrates a preferred placement of a tag on a document, file, or other similar object in accordance with preferred embodiments of the present invention. As previously mentioned, there are technical issues with both low and high frequency tags for the application of tagging documents in RF locating systems. For instance, low frequency radio waves (below 100 MHz, for example) readily penetrate paper and could therefore be considered to illuminate and excite RFID tags attached to documents. Because of the relatively long wavelength of low frequency waves, low frequency tags generally employ a multi-turn coil, resulting in a non-flat tag with a form factor incompatible with multi-page documents. On the other hand, high frequency tags, e.g., operating at 2.45 GHz, for example, may employ flat antennas, printed on plastic or paper, and may be sized on the order of two inches in length and have form factors compatible with documents. The moisture content in practical paper documents found in most offices, however, is sufficiently high such that high frequency radio waves can be substantially absorbed by a large number of documents on long shelves/drawers. In summary, low frequency waves readily transmit through paper, but low frequency tags have form factors typically incompatible with flat documents. On the other hand, high frequency tags have form factors compatible with flat documents, but high frequency waves are readily absorbed by paper having practical moisture content levels.

As illustrated in FIG. 9, in accordance with preferred embodiments of the present invention, high frequency tags are positioned or affixed on a perimeter or peripheral location on file folder/document 200 (although illustrated as file folder for convenience in FIG. 9, in other embodiments such tags are used with a more conventional document). Positioning such tags on a perimeter or peripheral location, particularly when used in conjunction with a system/method in accordance with the present invention, may more likely expose the tag to maximum RF signal strength, which serves to maximize the signal strength incident on the tag. In certain preferred embodiments of the present invention, such a low profile, high frequency tag 210 is placed on or near the perimeter or a perimeter edge of file folder/document 200, and more preferably, within a distance of not more than a half of a wavelength of the exciting second frequency $f_2$ from the perimeter, or outer edge, of the document, or file folder. In a preferred embodiment using 2.45 GHz radio frequency signals, the tag is placed not more than about 5 centimeters from the edge of the document. This distance of the tag's antenna from the perimeter of the document is equivalent to one half of the wavelength of the 2.45 GHz incident RF secondary frequency $f_2$ signal from the local exciter. In other preferred embodiments, tag 230 is positioned or affixed on file folder or document tab 240, which protrudes furthest from the center of file folder/document 200. In still other preferred embodiments, tag 220 may be placed near an area where the file folder folds along the y-axis. In these and other embodiments, it is important to note that tags may be more preferably placed along the perimeter of the file folder and preferably as long as it is not placed in the area denoted 250, i.e., in an area that is located a distance of greater than about one half of the wavelength of the radio frequency signal used to excite the tag. This placement of the high frequency tags will enable all tags in a long stack of tagged documents to be adequately energized by an incident high frequency RF signal.

It should be noted that such perimeter placement of low profile tags are optimally positioned in conjunction with the particular local exciter antenna and file drawer utilization, such as discussed in conjunction with FIG. 4. In accordance with the present invention, tags may be more optimally positioned on a document or file folder or the like, placed in cabinets, file drawers or the like, and then located or identified via a lower cost and lower complexity "one way" methodology.

A new and novel combination of the present invention, for locating and tracking files, coupled with a conventional stand-alone, or independent tag reader 25 may provide additional tracking capability to detect, report identities of files, documents or other objects transiting specified locations such as doorways or other portals. The ability to read identification tags from codes may be utilized to track documents, for example, as they leave a predetermined area and pass through an exit, as previously described.

Figure 10:
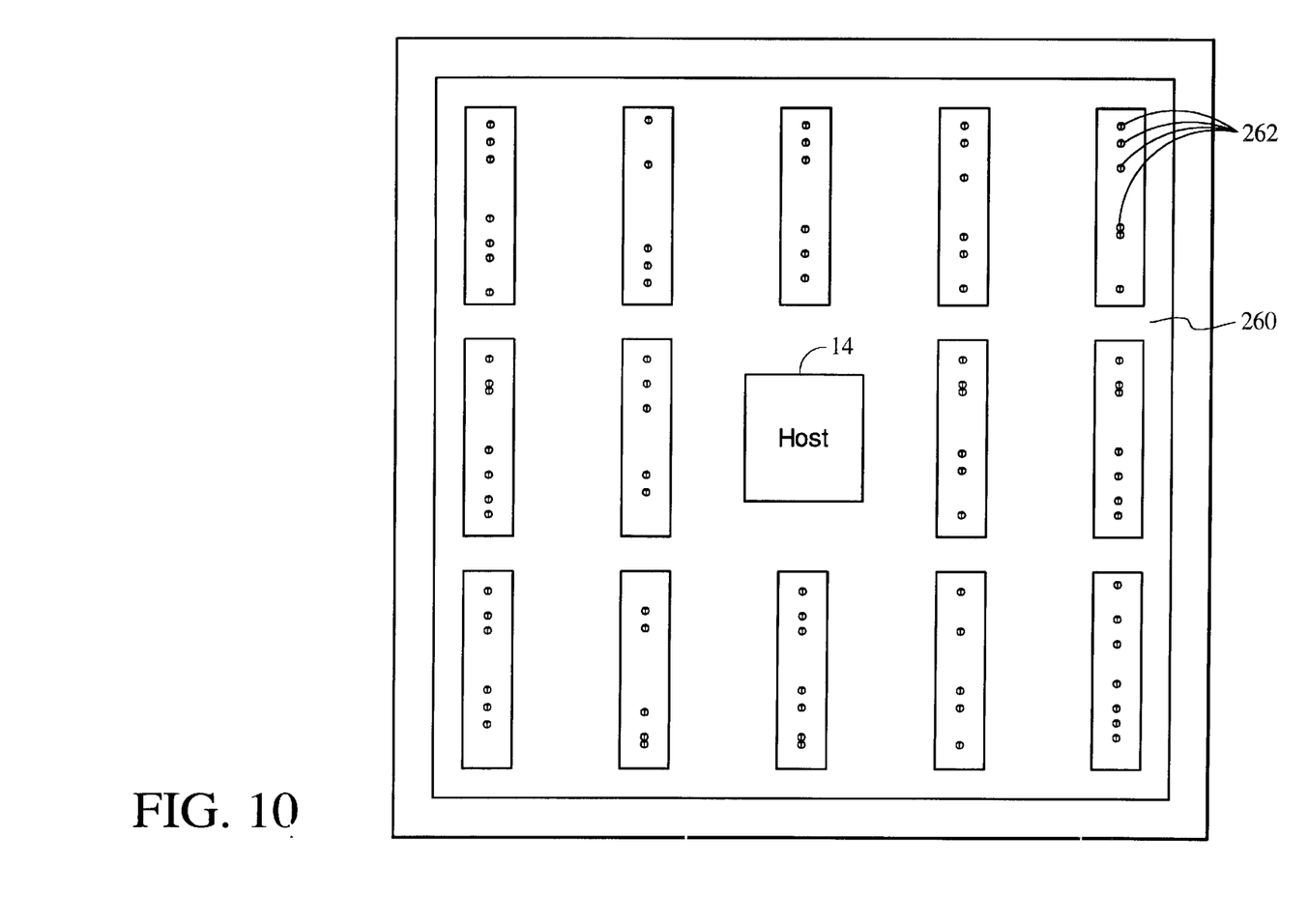
FIG. 10 illustrates an office or other environment in which documents or files are concentrically positioned around a host transceiver.

FIG. 10 illustrates an exemplary office or other layout of a system in accordance with the present invention. As illustrated, in the office or other work area 260, a number of local exciters 262 (located within file drawers, cabinets, etc., as previously described) may be positioned more or less, or substantially, concentrically with respect to host 14. In grouping the tagged file folders or documents in containers in such a concentric-type manner, the number of file folders or documents within the coverage range of host 14 may be maximized. In addition, a system and method for locating or identifying a large number of file folders, documents or similar objects of greater reliability may be obtained with such an arrangement.

The basic configuration of a single host transceiver communicating to multiple local exciters may be considered to form a "cell," and could represent an area of, typically 500 to 1000 square meters (or 300 to 1000, 300 to 1200, etc.). Networking of multiple cells via the PC network would provide coverage of a very wide area, covering large, single, or multi-level offices, a large warehouse or the like, including multiple buildings at multiple sites. Such a multi-cell networked system, defined as a diversity reception architecture, would allow the precise location of any tagged document to be identified from any PC in the network As will be understood and appreciated by those of skill in the art, in accordance with the present invention various automated systems and methods of locating and identifying objects such as file folders, documents and like may be provided, which enables such objects to be tracked or located, even if the objects are movable and may be located at any given point in time in one or a variety of locations.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for locating a particular object among a plurality of objects, each of the objects having a tag affixed thereto, the method comprising the steps of:

transmitting a first signal from one or more host transceivers to one or more exciters;

transmitting a second signal from the one or more exciters to the plurality of objects, wherein the second signal is received and modulated by the tag affixed to the particular object;

receiving the modulated second signal with one of the one or more host transceivers, wherein the location of the particular object is determined; and coupling a computer to the one or more host transceivers, wherein the computer receives and sends data from and to the one or more host transceivers.

2. The method of claim 1, further comprising the step of communicating data indicative of the location of the particular object to a computer, wherein the computer displays the location and characteristics of the particular object.

3. The method of claim 2, further comprising the steps of:

storing data indicative of characteristics of the objects into a database accessed by the computer; and storing identification codes for each of the tags into a database accessed by the computer.

4. The method of claim 3, wherein data indicative of user access to the database is stored in the database, wherein data indicative of user queries for particular objects are stored in the database, wherein data is retained in the database such that it may be determined which users queried for particular objects.

5. The method of claim 4, further comprising the steps of:

sequentially addressing the exciters to determine the location of each of the objects;

storing data indicative of the location of each of the objects in the database accessed by the computer.

6. The method of claim 5, wherein an inventory of the objects is produced.

7. The method of claim 6, wherein at a first time a first inventory of the objects is produced, wherein at a second time a second inventory of the objects is produced.

8. The method of claim 7, further comprising the steps of:

comparing the first inventory and the second inventory;

generating a list of objects in either the first inventory or the second inventory but not the second inventory or the first inventory.

9. The method of claim 8, further comprising the steps of:

sequentially addressing the exciters to determine the location of a second particular one of the objects;

storing data indicative of the location of the second particular one of the objects if a modulated second signal from the second particular one of the objects is received by the host transceiver; and indicating a lost-object condition if all of the exciters are sequentially addressed and the modulated second signal from the second particular one of the objects is not received by the host transceiver.

10. The method of claim 6, wherein a list of lost objects is produced based on the inventory and data in the database.

11. The method of claim 10, further comprising the step of comparing the list of lost objects with data indicative of user queries for particular objects.

12. The method of claim 11, further comprising the step of generating a list of user(s) who have queried for lost objects.

13. The method of claim 3, wherein at least a portion of the data indicative of characteristics of the objects are generated by optically scanning the objects.

14. The method of claim 1, further comprising the steps of:

sequentially addressing the exciters to determine the location of each of the objects;

storing data indicative of the location of each of the objects in the database accessed by the computer.

15. The method of claim 14, wherein an inventory of the objects is produced.

16. The method of claim 15, wherein at a first time a first inventory of the objects is produced, wherein at a second time a second inventory of the objects is produced.

17. The method of claim 16, further comprising the steps of:

comparing the first inventory and the second inventory;

generating a list of objects in either the first inventory or the second inventory but not the second inventory or the first inventory.

18. The method of claim 1, wherein a first exciter is coupled to the host transceiver, wherein the first exciter excites one or more of the tags and reads identification data from one or more of the tags.

19. The method of claim 1, wherein a first exciter coupled to the host transceiver, wherein the first exciter programs data into one or more of the tags.

20. The method of claim 1, wherein the objects comprise documents.

21. The method of claim 20, wherein the method locates a particular document in an office or other document storage area.

22. The method of claim 1, wherein the objects comprise files, wherein the method locates a particular file in an office.

23. The method of claim 22, wherein the office includes at least one area in which the objects are stored, wherein the one area has an entry through a user must pass to enter into or exit from the one area, wherein one or more independent, stand alone readers are coupled to the computer and are positioned in proximity to the entry, wherein a reader interrogates one or more of the tags and reads identification data from one or more of the tags as a user passes through the entry.

24. The method of claim 23, wherein the reader also interrogates a tag that identifies the user passing through the entry.

25. The method of claim 24, wherein a computer coupled to an independent reader or readers records which users passed through the entry and which objects passed through the entry with each user.

26. The method of claim 25, wherein the computer accesses a database storing data indicative of the objects, wherein the database stores data indicative of the objects and which users removed or returned the objects from or to the area.

27. The method of claim 1, wherein the computer is programmed so as to control the apparatus to perform a search cycle, wherein the particular object is located, wherein data representing the location of the particular object is stored by the computer.

28. The method of claim 1, wherein the objects comprise files or documents.

29. The method of claim 28, wherein tags are affixed in a peripheral portion of the files or documents.

30. The method of claim 28, wherein tags are affixed on a tab protruding from the files or documents.

31. The method of claim 28, wherein tags are affixed to a region of the file or document that is within a distance of one half of a wavelength of the second signal from an edge of the file or document, wherein the second signal is of a second frequency.

32. The method of claim 1, wherein the objects are stored in a container.

33. The method of claim 32, wherein the container includes an aperture through which the second signal may pass.

34. The method of claim 33, wherein the container comprises a filing cabinet.

35. The method of claim 1, wherein the host transceiver incorporates a diversity antenna to maximize the reception of the signal generated by the excited tag.

36. The method of claim 1, wherein a frequency transmitted by the exciter is adjusted over a range to achieve frequency diversity and to improve the reception of the signal generated by the excited tag.

37. The method of claim 1, wherein a frequency transmitted by the exciter is monotonically related to a power supply voltage to enable monitoring of the condition of a battery supply power to the exciter.

38. The method of claim 1, wherein the host transceiver autocorrelates the modulated signal from the excited tag, wherein the signal to noise ratio of the modulated signal from the tag is improved.

39. The method of claim 1, wherein the first signal is transmitted from the one or more host transceivers to the one or more exciters via a radio link.

40. The method of claim 1, wherein the first signal is transmitted from the one or more host transceivers to the one or more exciters via a hardware link.

41. The method of claim 1, wherein the first signal is transmitted from the one or more host transceivers to the one or more exciters via a hardware serial link.

42. The method of claim 1, wherein the one or more exciters comprise local exciters or desktop exciters.

43. A business environment in which a particular object may be located, comprising:

at least one area having a plurality of containers for storing a plurality of objects;

one or more host transceivers, wherein each host transceiver comprises a transmitter and a receiver;

one or more exciters, wherein at least one exciter is positioned within each of the containers, and wherein the one or more exciters receive a first signal from one of the one or more host transceivers, and, in response to the first signal, the one or more exciters selectively transmit a second signal to tags affixed to one or more of the objects, wherein the tag affixed to the particular object is excited by the second signal, wherein the excited tag selectively modulates the second signal and one or more of the host transceivers directly receives the signal modulated by the excited tag; and a computer coupled to the host transceiver, wherein the computer receives and sends data from and to the one or more host transceivers, wherein the computer displays information indicative of the container containing the particular object.

44. The environment of claim 43, wherein the one or more exciters are coupled to one or more antennas positioned within the containers.

45. The environment of claim 43, wherein the one or more exciters comprise a microcontroller, wherein the microcontroller switches the one or more exciters between a low power stand-by mode and a normal reception mode.

46. The environment of claim 45, wherein the microcontroller includes a non-volatile memory, and wherein the microcontroller periodically wakes up from the low power stand-by mode.

47. The environment of claim 43, further comprising an optical reader for reading optical information from the one or more objects, wherein data corresponding to an identification code on the tag affixed to the particular object is stored in a database accessed by the computer, and wherein data corresponding to optical information read from the particular object is stored in the database.

48. The environment of claim 43, wherein the objects comprise documents.

49. The environment of claim 48, wherein a particular document is located in an office.

50. The environment of claim 43, wherein the objects comprise files, wherein a particular file is located in an office.

51. The environment of claim 43, wherein the computer is programmed so as to control the apparatus to perform a search cycle, wherein the particular object is located, wherein data representing the location of the particular object is stored by the computer.

52. The environment of claim 43, wherein the containers include an aperture through which the second signal may pass.

53. The environment of claim 43, wherein the containers comprise filing cabinets.

54. The environment of claim 53, wherein at least some of the filing cabinets are positioned around a centrally located host transceiver.

55. The environment of claim 43, wherein the host transceiver incorporates a diversity antenna to maximize the reception of the signal generated by the excited tag.

56. The environment of claim 43, wherein a frequency transmitted by the exciter is adjusted over a range to achieve frequency diversity and to improve the reception of the signal generated by the excited tag.

57. The environment of claim 43, wherein a frequency transmitted by the exciter is monotonically related to a power supply voltage to enable monitoring of the condition of a battery supply power to the exciter.

58. The environment of claim 43, wherein the host transceiver autocorrelates the modulated signal from the excited tag, wherein the signal to noise ratio of the modulated signal from the tag is improved.

59. The environment of claim 43, wherein the first signal is transmitted from the one or more host transceivers to the one or more exciters via a radio link.

60. The environment of claim 43, wherein the first signal is transmitted from the one or more host transceivers to the one or more exciters via a hardware link.

61. The environment of claim 43, wherein the first signal is transmitted from the one or more host transceivers to the one or more exciters via a hardware serial link.

62. The environment of claim 43, wherein the one or more exciters comprise local exciters or desktop exciters.

* * * * *